United States Patent [19]

Wild et al.

[11] Patent Number: 4,837,671

[45] Date of Patent: Jun. 6, 1989

[54] STATE SIGNAL FORMATION FOR INDICATING THE TRANSITION INTO THE BYPASS MODE OF OPERATION IN AN APPARATUS FOR HIGH-VOLTAGE D-C TRANSMISSION

[75] Inventors: Georg Wild, Langensendelbach; Rembert Kohler, Nuremberg; Manfred Weibelzahl, Uttenreuth-Weiher; Martin Haushofer, Creglingen; Johann Messner, Erlangen, all of Fed. Rep. of Germany

[73] Assignee: Siemens Aktiengesellschaft, Berlin and Munich, Fed. Rep. of Germany

[21] Appl. No.: 193,511

[22] Filed: May 12, 1988

[30] Foreign Application Priority Data

May 15, 1987 [DE] Fed. Rep. of Germany ....... 3716351

[51] Int. Cl.4 .......................... H02J 3/36; H02H 7/10
[52] U.S. Cl. ......................................... 363/35; 363/51; 361/62
[58] Field of Search ...................... 363/35, 41, 49, 51, 363/54; 361/59–68

[56] References Cited

U.S. PATENT DOCUMENTS

| | | | |
|---|---|---|---|
| 4,638,416 | 1/1987 | Neupauer et al. | 363/35 |
| 4,639,848 | 1/1987 | Sakai | 363/35 X |
| 4,672,519 | 6/1987 | Liss | 363/51 X |
| 4,689,733 | 8/1987 | Guth et al. | 363/35 X |
| 4,727,467 | 2/1988 | Bendl et al. | 363/35 |
| 4,757,435 | 7/1988 | Wood et al. | 363/54 |

FOREIGN PATENT DOCUMENTS

0146725 7/1985 European Pat. Off. .......... 363/35 X

*Primary Examiner*—Patrick R. Salce
*Assistant Examiner*—Emanuel Todd
*Attorney, Agent, or Firm*—Kenyon & Kenyon

[57] ABSTRACT

A state signal is formed to indicate a transition to a bypass mode of operation. In forming the signal of each winding system of a corresponding converter transformer on a side of the converter transformer are determined, weighted with weighting factors and summed up. The summation current formed in this manner does not have any null zones in the normal operation of the converter. All weighting factors are different if the phase currents between the converter and the converter transformer are used to produce the summation current. In the case of a converter transformer which is connected to the converter via a delta-connected winding system and in which the winding currents are used, certain differences formed by the weighting factors are not to be the same. A DC Hall converter with an insertion hole is particularly well suited for weighting and combining the currents of each individual winding system.

15 Claims, 7 Drawing Sheets

STATE SIGNAL FORMATION FOR INDICATING THE TRANSITION INTO THE BYPASS MODE OF OPERATION IN AN APPARATUS FOR HIGH-VOLTAGE D-C TRANSMISSION

BACKGROUND OF THE INVENTION

The invention relates to a method for forming a state signal to indicate a bypass operation in a high voltage DC transmission system. More particularly, in a system including a converter, coupled to ends of a high voltage DC transmission line ("HVDC" line) and acting as a rectifier or inverter, after a normal commutation sequence is interrupted, the state signal indicates a successful commutation of the DC current to selected converter valves The successful commutation makes possible the flow of DC current and causes a bypassing of a side of a converter transformer connected to the converter. The bypassing of the side of a converter transformer is a "bypass" operation. Further described is a particularly advantageous apparatus for carrying out the method according to the invention.

High-voltage DC transmission lines ("HVDC" lines) may be terminated at both ends by converters which in turn are coupled, via converter transformers, to an AC network which, as a rule, has several phases. One of the two converters works here as an inverter and the other one works as a rectifier. If a multi-pole fault occurs in one of the two AC networks connected to each other by the converter transformers, converters and the HVDC line, it may be advantageous to initiate a so-called "bypass" operation in one of the two converters. In the case of an AC network disturbed by a two or three-pole short circuit, the affected network is separated from the one side of the HVDC line by the bypass operation. The flow of DC current on the HVDC line can thereby still be maintained for a certain amount of time with reduced nominal value. During a bypass operation no energy is transmitted between the AC networks. The bypass is particularly advantageously in avoiding a fast switching-off of the entire HVDC line in cases of a network fault of only short duration and it avoids a "start-up procedure" which is then necessary after correcting such a fault. The switching-off and start-up procedure are time consuming and may cause voltage variations in the adjacent AC networks A temporary initiation of a bypass in one of the converters can also be used when network filters are connected in one of the AC networks during a "start up procedure" of the HVDC line. The brief decoupling of the two AC networks, normally connected via the HVDC line, by the bypass, makes possible a time-coordinated connection of network filters and a fast control of the reactive power variations in the respective network that normally occur with such a connection. Excessively large transient network variations are also avoided using the bypass operation. After the decay of the transients caused by the addition of the network filters, the converter in question is s switched back to normal operation For initiating a bypass in one of the converters coupled to the HVDC line, a normal commutation sequence of valves of the converter is first interrupted. However, the valves, the current flow of which is now no longer relieved, still permit a flow of DC current through the side of the converter transformer connected to that converter. This current should be interrupted as fast as possible in order to avoid phenomena, such as premagnetization, from occurring to an increased degree in the magnetic circuit of the transformer. Such phenomena may impede fast switching of the HVDC line back to normal operation. To this end, the DC current must be commutated away from one of the valves still carrying current. This is accomplished by firing at least one selected converter valve. A DC current flow that bypasses the side of the converter transformer connected to the converter is made possible in this manner.

The occurrence of a multi-pole fault in one of the adjacent AC networks is recognized by a network monitor after about five to ten msec. A bypass, requested thereafter, is initiated by the successful commutation of the DC current to the selected converter valve or valves approximately twenty msec after the detection of the fault. In practice however, there is the danger that the necessary DC commutation is not successful. This can be caused by disturbed line voltages coupled to the converter via the converter transformer which can be loaded, for instance, with voltage increases, high frequency AC components or DC terms. Thus, the initiation of a requested bypass operation must be monitored for success or failure by the formation of a corresponding state signal so that, if required, other protective measures, such as a fast shutdown, can be initiated in time.

The disappearance of a current flowing between the respective converter and the corresponding converter transformer as the result of a successful initiation of a bypass has been monitored heretofore in a rather complicated manner. One such method uses "intermediate transformers∓ which are additionally connected in HVDC systems for measuring the current flowing to the existing AC main transformers on the side of the converter transformer connected to the converter. To this end, the secondary windings of the AC main transformers are short-circuited and supply, as a rule, several further transformers through whose primary side the main transformer secondary current flows. The secondary windings are connected in series. These are terminated with a load resistor and are designed separately in the magnetic circuit in accordance with a specially desired measuring application, for instance, for generating control signals and signals for addressing protective devices The intermediate transformers belong to this group and are AC current transformers designed for measuring the current as linearly as possible, even in the overcurrent range. The sum of the absolute amounts of the currents measured in this manner is utilized for monitoring the bypass.

Each of the main and intermediate transformers must be designed here so that the network currents, which are coupled over from the network side of the respective converter transformer and are as a rule superimposed by transient DC components, are imaged accurately enough at least for a certain period of time. This period of time should be at least as long as is required for the successful initiation of a bypass operation in the normal case. AC transformers of this type, which can transmit shifted short-circuit AC currents with superimposed transient DC components, in addition to a steady-state AC short-circuit current, to an ohmic load with the full information content, must be heavily overdesigned in the transformer core and the windings. This leads to large and costly designs and can lead to rather high load powers. The nominal overcurrent figure serving for the design of such AC converters must be determined taking into account the time constant of the connected AC network. This network time constant, however, is not always available and furthermore is a function of the current variable load state of the network.

SUMMARY OF THE INVENTION

The present invention overcomes the problems associated with using intermediate transformers to monitor bypass operations and produce state signals The present invention provides a unique method and a simple device for carrying out the method where, in an apparatus for high-voltage DC transmission, a state signal indicating a successful transition to a "bypass" mode of operation can be derived in a simple manner directly from the AC signals available on a shorted secondary side of the main transformers.

The problems are solved by a method for forming a state signal, which, after interruption of the normal commutating sequence the converter, acting as an inverter or rectifier, indicates a successful commutation of the DC current to selected valves of the converter which make possible the flow of DC current, the successful commutation thereby circumventing the side of a converter transformer coupled to the converter, including the steps of:
(a) measuring the currents on the side of the converter transformer connected to the converter;
(b) weighting the measured currents with weighting factors to form a summation current in such a manner that for a normal commutation sequence, the absolute value of the summation current has no null zones; and
(c) releasing the state signal if, at the end of a predetermined time after the interruption of the normal commutation sequence and the firing of the selected converter valves, the absolute value of the summation current has become zero, and wherein
(d) the predetermined time is set at least as large as is required for a successful commutation of the DC current to the selected converter valves.

Advantageous further embodiments of the method according to the invention and an especially suitable apparatus for carrying out the method are described below.

BRIEF DESCRIPTION OF THE DRAWINGS

The invention will be explained in greater detail below with reference to the figures briefly described as follows where.

DETAILED DESCRIPTION

Figure 1:
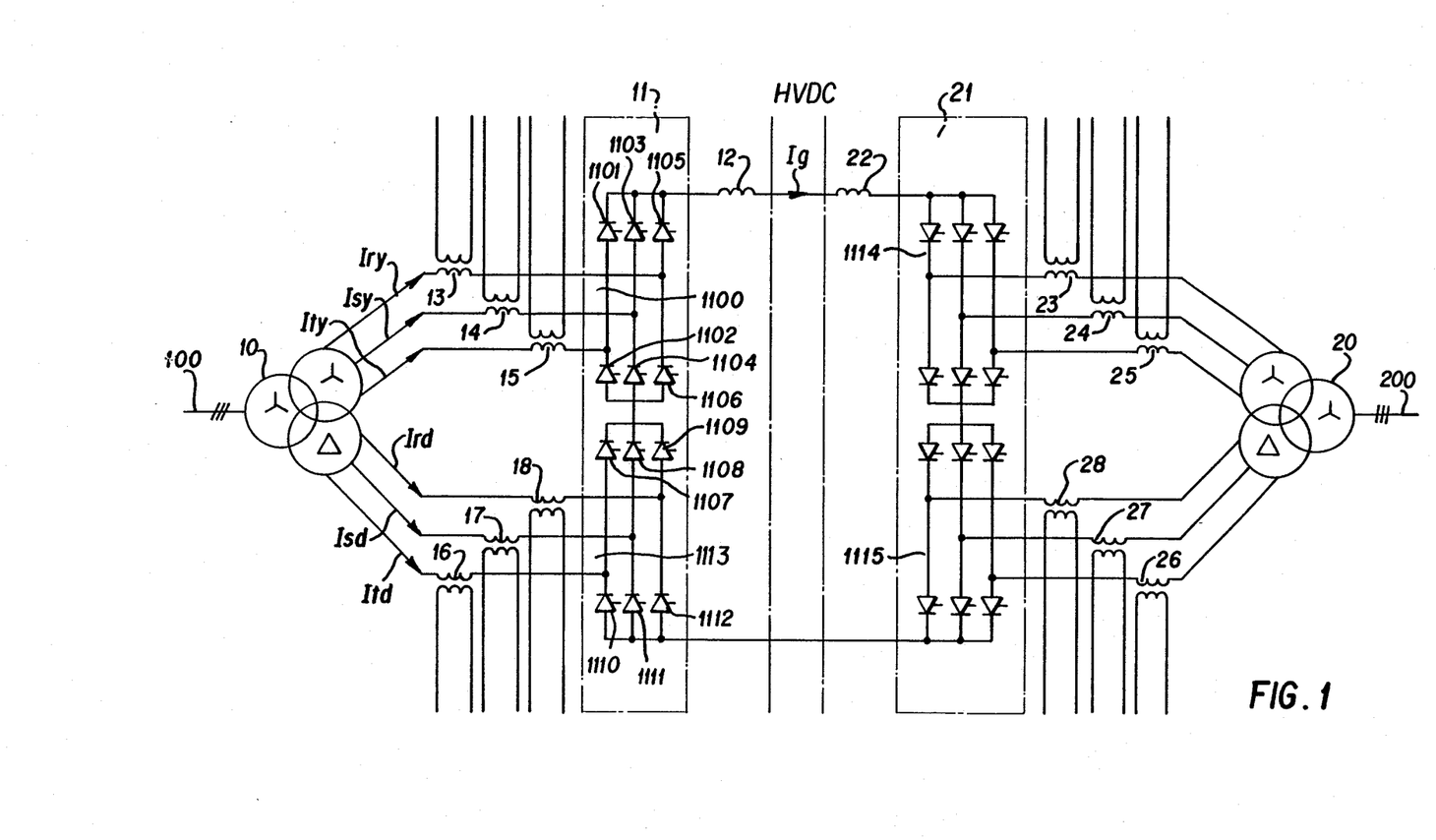
FIG. 1 shows a basic diagram of a known apparatus for high voltage DC transmission.

FIG. 1 is a basic block diagram of a known apparatus for high-voltage DC transmission which connects two AC networks 100 and 200 to each other. HVDC line carries a DC current Ig and is coupled at both ends via converters 11 and 21, respectively, and corresponding converter transformers 10 and 20, respectively, to the respective networks 100 and 200. Depending on the desired direction of the energy transmission, one of the two converters 11 and 21 acts as a rectifier and the other as an inverter. Discrete intermediate circuit chokes 12 and 22 can be provided or exist in parasitic form for feeding the DC current into the HVDC line.

In the specific circuit of FIG. 1, each converter includes a series circuit of two six-pulse, three-phase bridge circuits. Each bridge circuit is connected to either a Y- or delta-connected winding system on the one side of the corresponding converter transformer. In this particularly advantageous manner, twelve-pulse operation of the converters 11 and 21 is made possible.

In another embodiment, each converter transformer may have on the side connected to the corresponding converter, only one Y- or one delta-connected winding system. In this alternate embodiment only six-pulse operation is possible with a converter realized in a three-phase bridge circuit.

The main AC transformers 13 to 18 and 23 to 28, serve to measure the currents on the side of the respective converter transformer connected to the converter. In the illustrated embodiment of FIG. 1, the currents of each winding system are measured in the form of the respective phase currents. The phase currents between the converter transformer 10 and the converter 11 are, for instance, currents Iry, Isy, Ity for the Y-connected winding system of the converter transformer, and Ird, Isd, Itd for the delta-connected winding system of the converter transformer. In addition, it is also possible, in the case of a delta-connected winding system, to measure the winding currents directly.

If a bypass is to be initiated in converter 11 of FIG. 1, the normal commutation systems of the valves 1101 to 1106 of the upper part of the converter 1100 is first interrupted, i.e., the valves carrying current up to that time are no longer relieved from carrying current. Similarly, the lower part of the converter 1113 includes valves 1107 to 1112 and the normal commutation systems of these valves must be interrupted as well to carry out the bypass. In the upper part of converter 11 connected to the converter transformer having the Y windings the valves carrying current up to that time are assumed, for example, to be the valves 1101 and 1106. For initiating the bypass, the DC current Ig must be commutated either from the valve 1103 to the selected valve 1105 or from 1106 to 1104 so that the flow of DC current through the Y-connected upper winding system of the converter transformer is interrupted. In order to initiate the bypass it is also necessary that the current must be commutated in the lower part 1113 of the converter. Selected valves of 1107 to 1112 are assumed to be those carrying the current and the current $I_g$ must be commutated to other ones of the valves so that the flow of current through the delta connected lower winding system of the converter is interrupted. In converter 21 there are also upper and lower parts 1114 and 1115 respectively which have valves controlled in the same manner as the upper and lower parts 1100 and 1113 of converter 11 when a bypass is to be initiated. It is necessary to monitor the disappearance of every current on the side of the converter transformer connected to the converter to determine whether a bypass operation is successful. However, simple addition of all phase currents per winding system of the transformer is not sufficient, since an incorrect summation current signal could be caused by the mutual cancellation of two phase currents of different polarity.

According to the present invention the currents on the side of the converter transformer connected to the converter for each winding system are first weighted with weighting factors and then are summed. Suitable selection of the weighting factors can prevent an incorrect summation current that has cyclically occurring null zones due to mutual current cancellation. A state signal 2 indicating the successful transition to the bypass operation can be produced from the magnitude of this summation current. For this purpose, a predetermined time after the request for bypass operation, the magnitude of the summation current is monitored to determine whether it has assumed the null value. The predetermined time must be chosen so as to allow the DC current to be normally commutated reliably to the chosen valve and to allow all transition processes to decay if the bypass is initiated successfully. In this manner it is ensured that an active state signal indicating a successful bypass operation is released only if each individual one of the currents measured on the side of the converter transformer connected to the converter has actually become zero.

The weighting factors must be chosen so that with a normal commutation sequence, the absolute value of the summation current has no null zones. If the currents on the side of the converter transformer connected to the converter are determined in the form of phase currents as is the case, for instance, in the apparatus shown in FIG. 1, the weighting factors per winding system must have different magnitude with the same sign or polarity, independent of the specific type of connection thereof. It is particularly advantageous if the weighting factors are, in addition, inteqral numbers. If, in the embodiment of FIG. 1, the values 1, 2 and 3 are chosen uniformly for the two winding systems, an active state signal is formed if the following applies:

$$|1 \cdot Iry + 2 \cdot Isy + 3 \cdot Ity| + |1 \cdot Ird + 2 \cdot Isd + 3 \cdot Itd| =$$

$$\Sigma|Iyd| = 0$$

In this embodiment it does not matter which of the weighting factors 1, 2, 3 is assigned to each of the phase currents.

Figure 2:
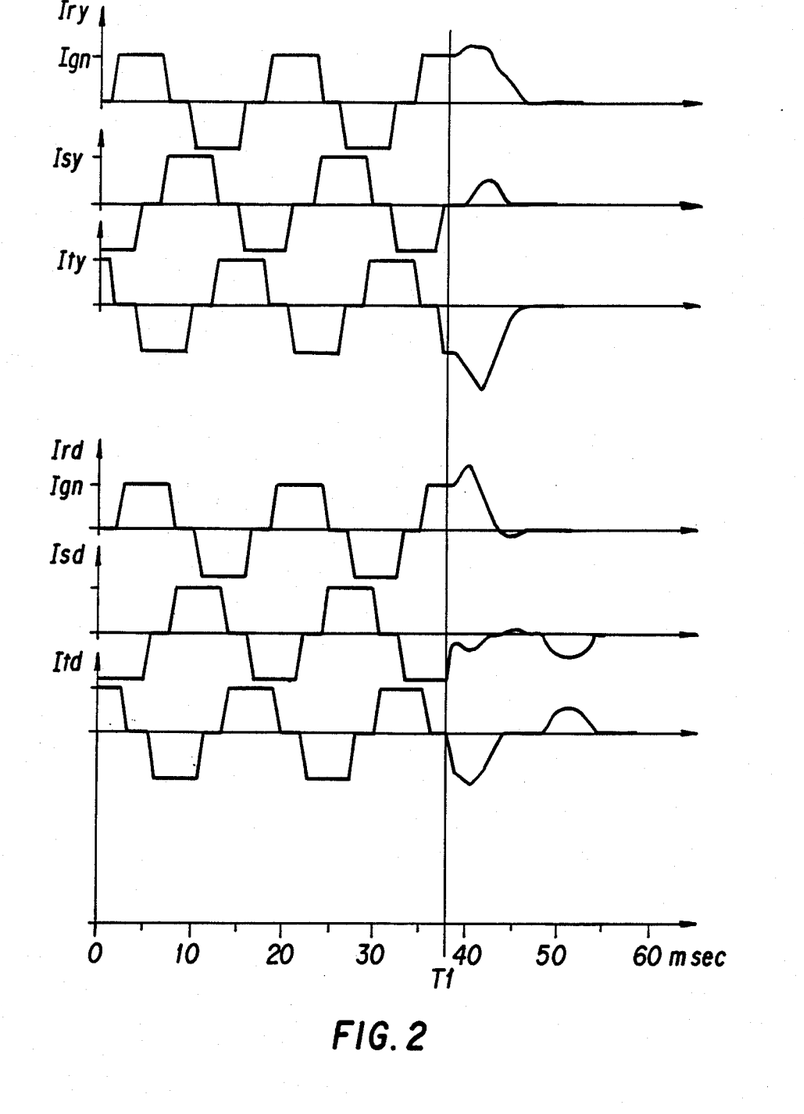
FIG. 2 illustrates phase current waveforms which occur between one of the converters and the corresponding converter transformer in the apparatus of FIG. 1 before initiation of a bypass and after the successful initiation of a bypass operation.
Figure 3:
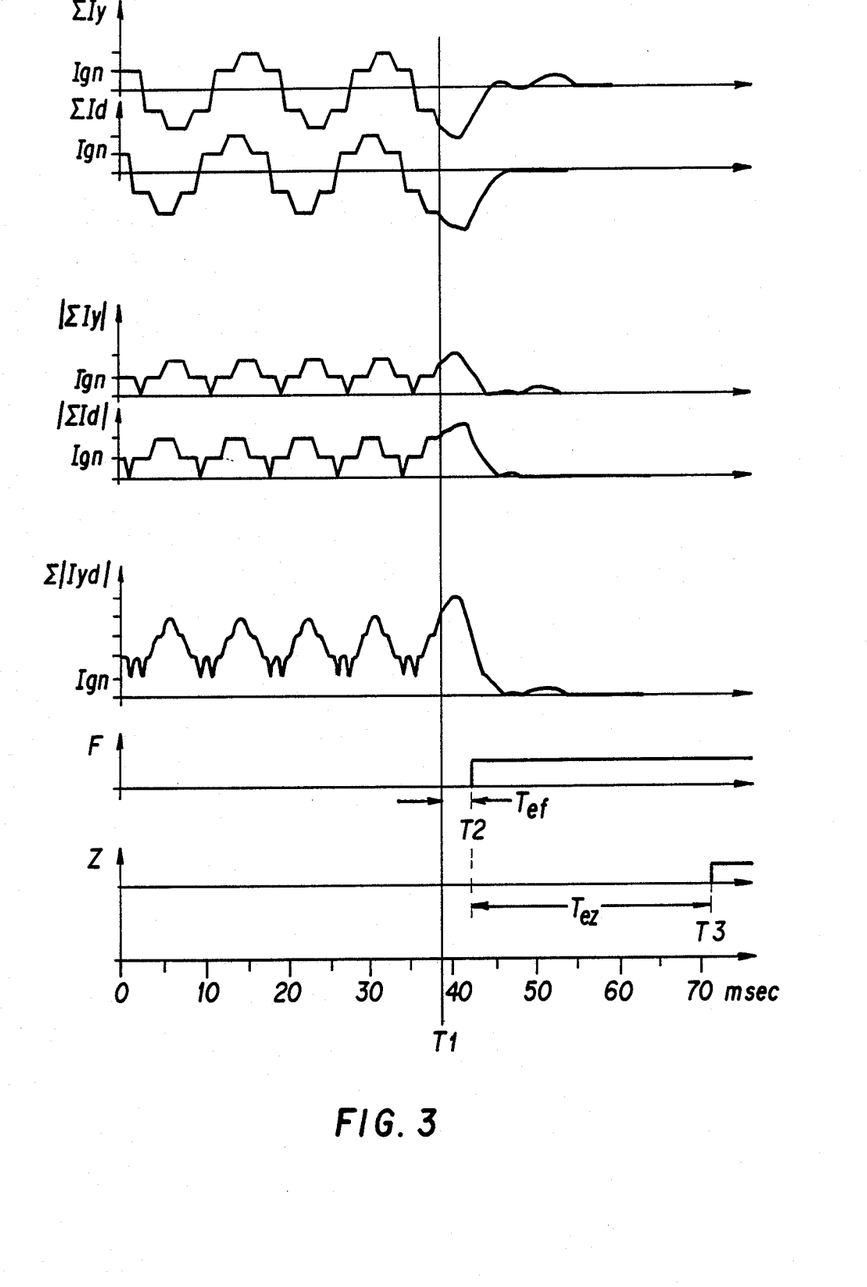
FIG. 3 illustrates summation currents for forming the state signal according to the method of the invention, derived from the phase current waveforms of FIG. 2.

In FIGS. 2 and 3, the formation of a state signal Z for this embodiment is shown clearly by means of the waveforms of the phase currents. The individual phase currents have an amplitude Ign corresponding to the nominal value of the high voltage DC current Ig. The transitions in the individual current waveforms do not occur in exact step fashion due to the finite time periods associated with the commutation. It is assumed that a multi-pole fault occurs in the AC network 100 at time T1, and that this fault makes necessary the initiation of bypass operation in the converter 11.

FIG. 2 illustrates the waveforms of the phase currents Iry Isy, Ity and Ird, Isd, Itd, respectively, for the Y (y) and the delta (d) winding system of the converter transformer 10 before and after the occurrence of the network fault at the time T1 in such a system. It is seen that about 20 msec thereafter, all phase currents have decayed to zero when an initiated bypass operation has been successful.

According to the method of the invention, the summation currents $$|\Sigma Iy| = |A \cdot Iry + B \cdot Isy + C \cdot Ity|$$

$$|\Sigma Id| = |D \cdot Ird + E\ Isd + F \cdot Itd|$$

formed from the addition of the phase currents weighted with the weighting factors A, B, C and D, E, F, respectively, are shown in FIG. 3. Taking into consideration the general conditions $$A \neq B \neq C, D \neq E \neq F,$$

the weighting factors are specifically chosen as $$A = D = 1, B = E = 2, C = F = 3$$

and the absolute amounts of the sum currents of the two winding systems are combined in a total sum current $$\Sigma|Iyd| = |\Sigma Iy| + |\Sigma Id|$$

It is assumed that a network fault determination requests bypass operation by delivering a signal F at the time T2, the end of a determination time, Tef, of about 8 msec, counted from when the occurrence of the fault at the time T1.

Finally, FIG. 3 illustrates the formation of the state signal Z at the time T3, a predetermined time Tez after the request for the bypass operation. In case of a failed bypass operation, the signal $\Sigma|Iyd|$ would indicate a continuous DC current, depending on the chosen weighting factor values. This continuous DC current would have an order of magnitude of possibly a multiple of the nominal value Ign, so that an active state signal would not be created at time T3.

As stated above, in the case of converter transformers which are connected Via at least one delta-connected winding system to the corresponding converter or converter part, the winding currents Irdw, Isdw, Itdw can be utilized instead of the phase currents, Ird, Isd, Itd for the purpose of forming the state signal.

Figure 4:
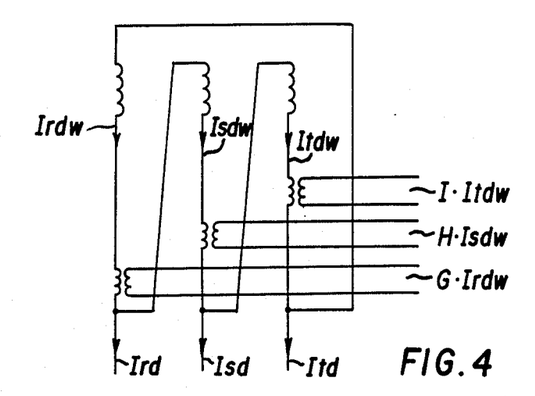
FIG. 4 illustrates a delta-connected winding of a converter transformer connected to the converter and having winding-current measurement.

In FIG. 4, a corresponding arrangement for a delta-winding system is shown by way of example. Also in such a case a summation current can be formed by means of the method according to the invention by combining the suitably weighted winding currents in place of the phase currents in the embodiment described above. The absolute value of the summation current has no null zones during a normal commutation of the corresponding converter, and is therefore suitable for forming the desired state signal Z.

Figure 5A:
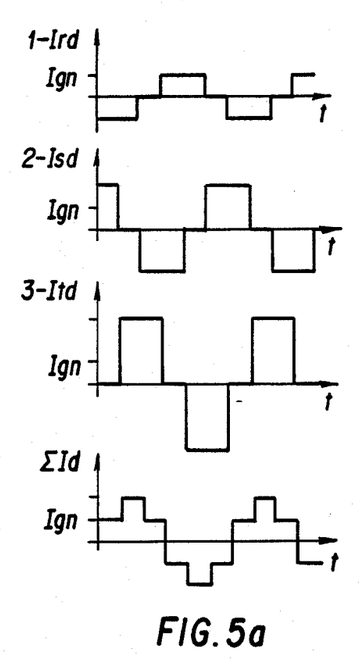
FIGS. 5a to 5d illustrate summation currents having different weighting for each individual current in a delta-connected converter transformer on that side of the transformer connected to the converter.
Figure 5B:
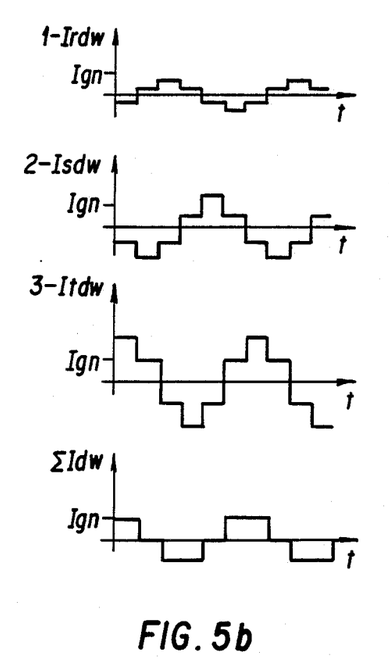
Figure 5C:
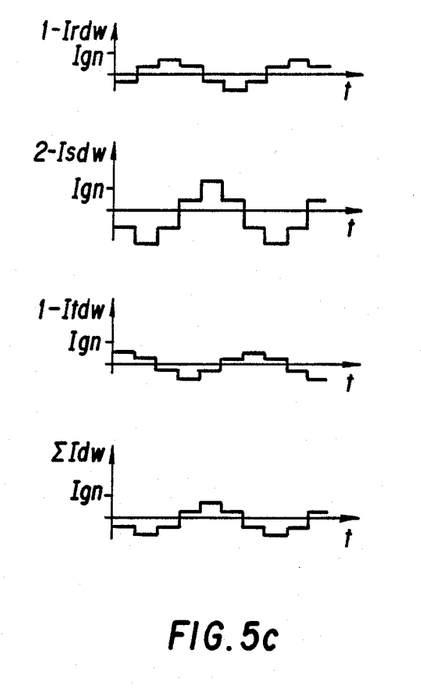
Figure 5D:
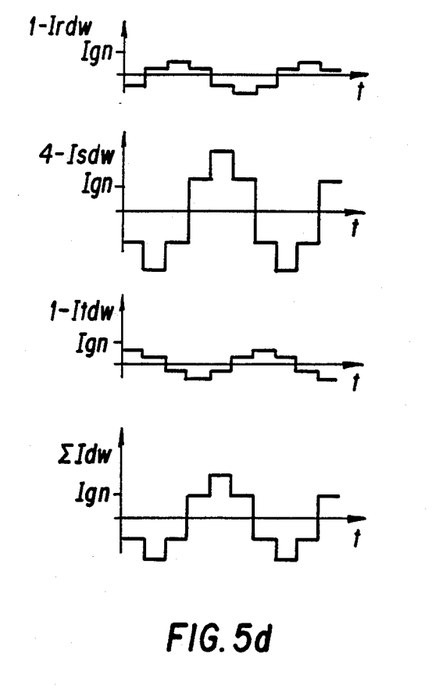

If for this purpose the arrows illustrated in FIG. 4 are initially conceived of as counting arrows, each current flowing in the direction of the arrows is assumed to be positive. It is seen that in the example of FIG. 4, all winding current counting arrows are uniformly oriented counterclockwise about the delta-shaped winding system. Furthermore, the winding currents Irdw, Isdw, and Itdw, respectively, occurring when advancing in this direction, are associated with a first, second or third weighting factor G, H and I, respectively. Taking into consideration these conventions, it can be shown that the weighting factor differences G−H, H−I and I−G must have different values so that the summation current Idw according to the method of the invention does not include any null zones. Naturally, the current-counting arrows for the winding current can also be oriented clockwise about the delta shaped winding system or not uniformly oriented in a selected direction. In such cases, the weighting factor differences must be adapted accordingly, with respect to polarity, to the prevailing current-counting arrow convention. Advantageous weighting factor combinations which also meet the conditions above are the combination 1, 1, 2 and 1, 1, 4, if integral-number factors are used FIGS. 5c and 5d illustrates summation currents which are free of null zones and Which result from weighting the winding currents of a delta winding with these combinations.

Again it does not matter Which Winding current is associated with which of the factors in detail from the weighting factor combination. FIG. 5b further illustrates the method according to the invention, juxtaposing the presentation of the winding currents of FIGS. 5c and 5d using the same weighting factors as used for weighting the phase currents of a delta winding, 1, 2, 3 in the first embodiment disclosed and the summation currents resulting therefrom. For the sake of simplification, the transition in the individual current wave forms are shown as steps. This assuming approximately vanishing communication times. While the weighting of the phase currents Ird, Isd, Itd of the delta winding with the combination 1, 2, 3 leads to a sum current free of null zones, FIG. 5b illustrates that this is no longer the case in using the same weighting with the winding currents.

By substituting the factors 1, 2, 3 in the weighting factor differences given above, one obtains with G=1, H=2, I=3:

G−H=1−2=−1; H−I=2−3=−1;
I−G=3−1=2.

It is seen that in this example, two weighting factor differences have the same value. The combination 1, 2, 3, is therefore not suitable for weighting winding currents in a delta-connected winding system because it causes a summation current with null zones which is unusable for the formation of the desired state signal.

Figure 6A:
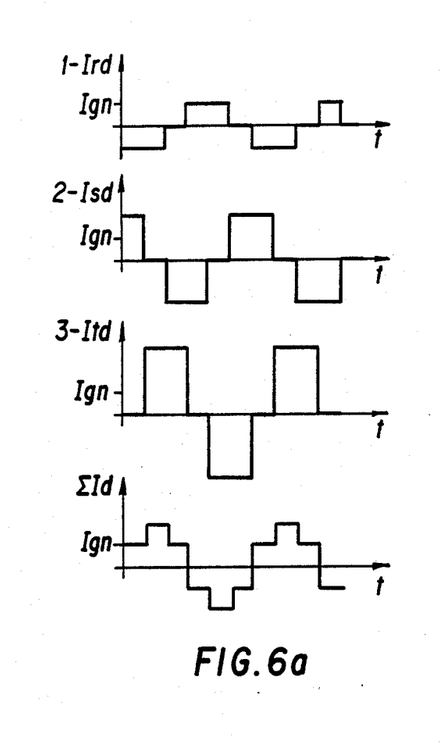
FIGS. 6a and 6b illustrate summation currents with different weightings for the individual currents and null system suppression in a delta-connected converter transformer on that side of the transformer connected to the converter.
Figure 6B:
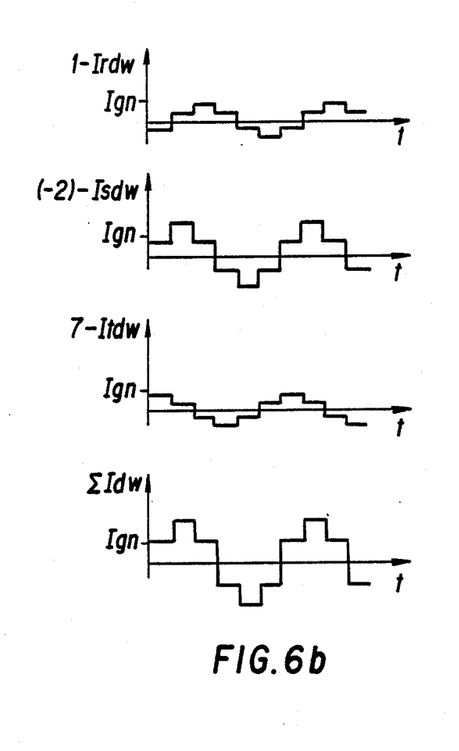

Additional circulating currents flow in the winding triangle if converter transformers which are connected to the converter via a compensation winding delta-connected winding system are made without additional compensation windings. These additional circulating currents occur already in case of a slight asymmetry in the AC network feeding the converter transformer and if the converter is disconnected. If "zero current system" is included in the determination, especially in the formation of the state signal from the sum of the weighted winding currents it can lead to erroneous releases of the state signal. However, this problem can be eliminated according to the method of the invention, in a particularly advantageous manner, by selecting the weighting factors in such a manner that they result not only in different values in the weighting factor differences, but also in a value of zero when added together One possible weighting factor combination which meets both conditions, formed advantageously using integral numbers, consists, for instance, of the numbers 1, 1, −2. In FIG. 6b, the winding currents Irdw, Isdw, Itdw weighted therewith are shown in the case of a delta-connected winding system and the summation current ΣIdw, resulting therefrom is free of null zones. Again, for comparison, phase currents Ird, Isd, Itd weighted with the factor combination 1, 2, 3 in a delta winding and the summation current Id resulting therefrom are shown in FIG. 6a.

In principle, combinations with odd-numbered weighting factors are possible as long as the conditions set forth above for obtaining a summation current free of null zones in the measurement of the phase and winding current are met by the choice of weighting factors.

Figure 7:
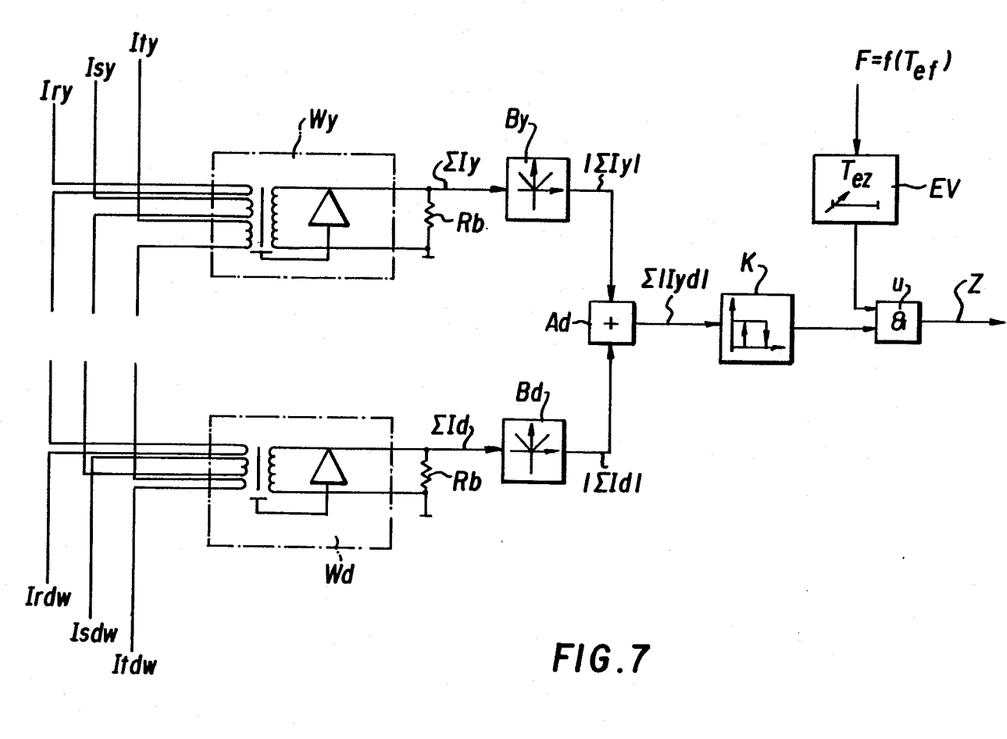
FIG. 7 illustrates an embodiment of an advantageous apparatus for carrying out the method according to the invention.

FIG. 7, illustrates a particularly advantageous apparatus for carrying out the method according to the invention. It was assumed here that the converter transformer, not shown, is connected via a Y-and a delta-connected winding system to the corresponding converter. The currents, for instance, on the Y-winding side, the phase currents Iry, Isy, Ity with the weighting 1, 2, 3 and on the delta-winding side, the winding currents Irdw, Isdw, Itdw with the weighting 1, −2, 1, are measured via main current transformers. DC transformers Wy and Wd perform the simultaneous weighting and combining of the phase currents of the Y connected, and the winding currents of the delta-connected winding systems to form the summation currents ΣIy and ΣId in this preferred embodiment. These summation currents are present at load resistors at the outputs of the respective transformers. The DC transformers are designed as DC Hall transformers with an insertion hole. The electric conductors carrying the individual currents are brought through the insertion hole in loop fashion with a weighting-dependent number of turns and winding direction. Each respective DC transformer is connected to one amount former By and Bd for ΣID forming the absolute values of the summation currents ΣIy and ΣId. The outputs of By and Bd are combined in an adder Ad to form the over all current signal Σ|Iyd|.

The means for forming the state signal Z from this overall current signal Σ|Iyd| of all winding systems of the converter transformer consists preferably of a comparator K, a switching-on delay device EV and an AND stage U. THe comparator K generates an active binary signal if the value of the overall current signal Σ|Iyd| falls below a threshold. The state signal Z is generated at the output of the AND state U which has as input signals the comparator output signal and a bypass request signal F delayed by a time $T_{EZ}$ via an adjustable switching-on delay device. Preferably, this request signal F is generated by a network monitor and is available at the end of the measuring time Tef after the occurrence of a network fault that makes the initiation of a bypass necessary.

The apparatus according to the invention has the advantage that by using DC plug-in transformers, the weighting and combination of the currents per winding system is possible in a particularly simple manner. The use of additional intermediate transformers which must be magnetically overdesigned for the purpose of transmitting DC transients and a subsequent separate amount former for each of the currents to be measured can therefore be dispensed with.

We claim:

1. In a system including a high voltage DC transmission line and a converter which acts as a rectifier or inverter coupled to one of the ends of the transmission line, a method for forming a state signal, which, after interruption of a normal commutating sequence of the converter, indicates a successful commutation of the DC current to selected valves of the converter which make possible the flow of DC current, the successful commutation thereby circumventing the side of a converter transformer coupled to the converter, comprising the steps of:

(a) measuring currents on the side of the converter transformer connected to the converter;

(b) weighting the measured currents with weighting factors to form a summation current in such a manner that for a normal commutation sequence, the absolute value of the summation current has no null zones; and (c) releasing the state signal if, at the end of a predetermined time after the interruption of the normal commutation sequence and the firing of the selected converter valves, the absolute value of the summation current has become zero, and wherein (d) the predetermined time is set at least as large as is required for the successful commutation of the DC current to the selected converter valves.

2. The method of claim 1, wherein said step of measuring includes measuring phase currents at an output of the side of the converter transformer connected to the converter and wherein the weighting factors of the measured currents have the same sign and different magnitude.

3. The method of claim 1, wherein the converter transformer includes a delta-connected winding system and wherein said step of measuring includes measuring winding currents of the delta-connected winding system wherein if uniformly oriented counting arrows for the winding currents are weighted in a selected direction about the delta-connected winding system, the three winding currents occurring when advancing in this direction, are weighted with a first, second, and third weighting factor respectively, where differences between the first and second, weighting factors, the second and third weighting factors, and the third and first weighting factors have different values.

4. The method of claim 3, wherein a sum of the first, second and third, weighting factors is equal to zero.

5. The method of claim 1 wherein the converter transformer has several winding systems available on the side of the converter transformer connected to the converter, and each separate winding system is connected to a separate part of the converter wherein respective converter parts are connected in series, further comprising the steps of:

forming, for each winding system separately, a summation current by measuring, weighting and combining currents, and combining absolute values of the summation currents of each of the winding systems to form the state signal.

6. The method of claim 2 wherein the converter transformer has several winding systems available on the side of the converter transformer connected to the converter, and each separate winding system is connected to a separate part of the converter wherein respective converter parts are connected in series, further comprising the steps of:

forming, for each winding system separately, a summation current by measuring, weighting and combining currents, and combining absolute values of the summation currents of each of the winding systems to form the state signal.

7. The method of claim 3 wherein the converter transformer has several winding systems available on the side of the converter transformer connected to the converter, and each separate winding system is connected to a separate part of the converter wherein respective converter parts are connected in series, further comprising the steps of:

forming, for each winding system separately, a summation current by measuring, weighting and combining currents, and combining absolute values of the summation currents of each of the winding systems to form the state signal.

8. The method of claim 4 wherein the converter transformer has several winding systems available on the side of the converter transformer connected to the converter, and each separate winding system is connected to a separate part of the converter wherein respective converter parts are connected in series, further comprising the steps of:

forming, for each winding system separately, a summation current by measuring, weighting and combining currents, and combining absolute values of the summation currents of each of the winding systems to form the state signal.

9. The method of 5, wherein the converter transformer has at least one Y- and one delta-connected winding system available on the voltage side connected to the converter.

10. The method of 6, wherein the converter transformer has at least one Y- and one delta-connected winding system available on the voltage side connected to the converter.

11. The method of 7, wherein the converter transformer has at least one Y- and one delta-connected winding system available on the voltage side connected to the converter.

12. The method of 8, wherein the converter transformer has at least one Y- and one delta-connected winding system available on the voltage side connected to the converter.

13. The method of any one of claims 1 to 12, wherein the weighting factors are integral numbers.

14. In a system including a high voltage DC transmission line and a converter which acts as a rectifier or inverter coupled to one of the ends of the transmission line, an apparatus for forming a state signal, which, after interruption of the normal commutating sequence of the converter, indicates a successful commutation of the DC current to selected valves of the converter which make possible the flow of DC current, the successful commutation thereby circumventing the side of a converter transformer coupled to the converter, comprising:

(a) a plurality of AC transformers for measuring currents on the side of the converter transformer connected to the converter, wherein said AC transformers comprise magnetic circuits which are designed so that they transmit the disturbed currents and in particular their transient DC components in the event of a network fault, at least for a time as long as is required for a successful commutation of the DC current to the selected converter valves;

(b) DC transformers for combining the measured currents of each winding system by bringing the electric conductors carrying the current through DC converters in loop fashion, the number of turns and direction of the loop being dependent on a desired weighting factor for each current;

(c) absolute value formers for forming the absolute values of the output signals of the DC transformer;

(d) an adder for combining output signals of the absolute value formers; and (e) means for forming the state signal from the output signal of the adder.

15. The Apparatus of claim 14, wherein said DC transformer comprise Hall generators.

* * * * *